H. ARNOLD & M. LEVY-DORN.
SENSITIVE PLATE FOR RÖNTGEN PHOTOGRAPHY AND PROCESS OF MAKING THE SAME.
APPLICATION FILED MAR. 1, 1915.
1,195,432.
Patented Aug. 22, 1916.
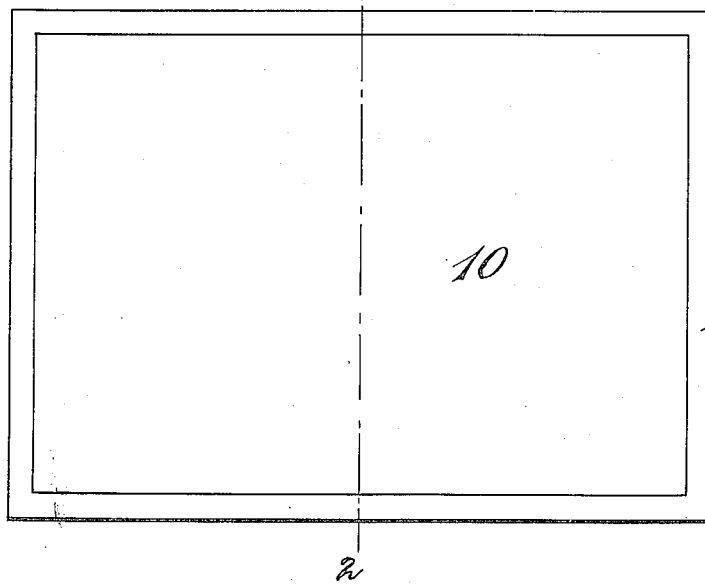
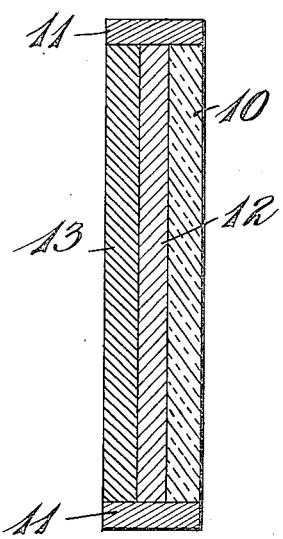
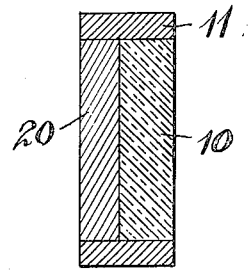
Hans Arnold
Max Levy-Dorn
Inventors
By their Attorney

UNITED STATES PATENT OFFICE.

HANS ARNOLD, OF CHARLOTTENBURG, AND MAX LEVY-DORN, OF BERLIN, GERMANY.

SENSITIVE PLATE FOR RÖNTGEN PHOTOGRAPHY AND PROCESS OF MAKING THE SAME.

1,195,432. Specification of Letters Patent. Patented Aug. 22, 1916.

Application filed March 1, 1915. Serial No. 11,179.

*To all whom it may concern:*

Be it known that we, Dr. HANS ARNOLD and Prof. Dr. MAX LEVY-DORN, both subjects of the German Emperor, and residing at Charlottenburg, Germany, and Berlin, Germany, respectively, have invented certain new and useful Improvements in Sensitive Plates for Röntgen Photography and Processes of Making the Same, of which the following is a specification.

It has long been known, that Röntgen rays and rays from radio-active substances are able to penetrate several photographic plates placed one behind the other. By a single plate the whole energy of the rays is not fully converted into chemical energy. Experiments to more completely utilize the rays by providing the backs of the plates with a layer of a mass that strongly absorbs the rays have practically failed, the photochemical process only taking place to a limited extent inside the layer which is sensitive to light. On the other hand, the direct addition of ray absorbing substances to such layer is very difficult and has not been satisfactorily done in practice. It is not practicable to add soluble substances to the light sensitive emulsion since they are washed out by washing the emulsion. If insoluble substances be employed, such preparations must be excluded which are crystalline or have a tendency to become crystalline after some time, which would mean that the plates become less sensitive when kept in stock. For that reason lead salts, for instance, which it is well known possess a great power for absorbing Röntgen rays and the like, cannot be applied, because the chlorids, bromids and iodids present in the emulsion react with the lead salts present, forming crystalline lead halogen salts.

From what has been said above, it follows that it is feasible to add to the emulsion only such substances, in a very finely divided state as do not combine with the constituents of the emulsion while they possess a great absorbing power for rays. Those substances which contain elements of a high atomic weight have proved most suitable for the purpose. For instance, finely divided oxids can be added to the emulsion. An oxid most suitable is thorium oxid which can be obtained as a very fine vapor-like powder by igniting a mixture of thorium nitrate and an ammonium salt. The effect desired is still better attained by the addition of the substances in a colloidal state. According to requirements clear or more or less opaque sols may be applied and even a solid sol can be added to the emulsion. Similarly as above mentioned, the sol of thorium hydrate has proved most suitable, which can be prepared according to any of the methods well known, *i. e.* by dialysis or treatment with very dilute acids. There is no precipitation within the emulsion, the gelatin acting as a protective colloid. The additions cannot be washed out, because they are absorbed by the emulsion. It is evident that a great number of other substances may be employed for the same purpose. For instance, we may mention tungstic acid the sol of which is not precipitated by electrolytes. Tungstic acid has been used before in photography for photographic screens. By the present method we have succeeded in incorporating the oxids and hydrates of metals, and metals in their colloidal state, in the emulsion of the plates. The quantities of the substances to be added can be varied by altering the concentration of the colloidal solutions. By reducing the size of the particles the light absorbing substance can be distributed over a larger surface. As a rule, a few milligrams of the substance will be sufficient for one photographic plate. Experiments have proved, that photographic plates thus prepared are very sensitive to Röntgen rays and rays from radio-active substances. Those plates require less time for exposure to light and the pictures produced are stronger and clearer than those obtained in the old manner.

We have also found, that some substances as additions to the emulsion, for instance a colloid of selenium have the disadvantage of producing a veil on the picture. That drawback can be remedied by placing two layers on the plate, one over the other, the upper layer containing the light sensitive substance, and if desired, the additional ray absorbing substance; while the lower layer consists only of the ray absorbing substance. The emulsion containing the ray absorbing substance may be prepared without the simultaneous application of silver salts, so that it can be prepared in day light. Each plate is thus provided, as it were, with a strengthening screen, the action on the plate being in fact much stronger.

As an example for preparing a dry photographic plate, containing tungstic acid in a colloidal state, we proceed as follows:—
We prepare a colloidal tungstic acid solution by a careful dialysis of a sodium tungstate solution that has been very slightly acidified, and select the concentration so that there is 0.4–0.5 gr. $WO_3$ per liter. We then add to that solution 140 gr. of gelatin, 72 gr. of potassium bromid and 7 gr. of potassium iodid, all being heated on the water bath. In the meantime we dissolve in a separate vessel 100 gr. of silver nitrate in one liter of water and add that solution to the solution of gelatin stirring all the while. The mass is allowed to cool and to solidify and is then washed. During the washing the colloidal tungstic acid solution does not diffuse through the gelatin as is the case with real solutions but remains in the emulsion. The gelatin as protective colloid also prevents the precipitation. If the emulsion is poured on plates, a plate having a size of 18 by 24 cm. contains 0.0015 gr. $WO_3$.

If a colloidal thorium oxid solution be used which has been prepared by treating thorium hydrate with thorium nitrate, it is advisable to dissolve the silver nitrate in the colloidal thorium nitrate solution and to add that liquid mixture to the gelatin solution. It is advantageous to determine by experiments in each case the best method of making the addition and to take care that the colloidal solution is not precipitated and that the size of the particles is not altered during the process. Of course, one must also take care that the colloidal solution is not changed into a real solution, which would be washed out from the gelatin.

It will be understood that the light sensitive emulsion forms the upper layer, while the lower layer is formed by the ray absorbing substance containing no light sensitive substance.

Several forms of the invention are illustratively exemplified in the accompanying drawing, wherein—

Figure 1 is a front elevational view of a photographic plate provided with two superimposed layers on the glass support; Fig. 2 is a vertical sectional view thereof, on the line 2—2 of Fig. 1; and Fig. 3 is a vertical sectional view of a form of photographic plate in which there is but a single layer on the glass support.

Referring to the drawing, and particularly to Figs. 1 and 2 thereof, 10 denotes the support which is of glass or the like, and may be held in a suitable frame 11. Placed upon the glass support or plate 10 is a stratum, 12, of an emulsion of a ray absorbing substance, and superimposed on the stratum 12 is a second stratum 13, consisting of an ordinary photographic emulsion which may, if desired, have any of the ray absorbing substances contemplated by our invention admixed therewith.

In Fig. 3 the form of invention shown is one in which the glass plate 10, held in the support 11, is provided with a stratum 20 consisting of a mixture of photographic emulsion and ray absorbing substance.

What we claim is:—

1. The herein described method of preparing highly sensitive photographic plates impenetrable by Röntgen rays and rays from radio-active substances, which method consists in applying to a support light sensitive substances, and ray absorbing substances in a colloidal state, substantially as described.

2. The herein described method of preparing photographic plates of the character specified, which method consists in applying to a support a layer of ray absorbing emulsion in a colloidal state, and superimposing on said layer a second layer of a light sensitive emulsion.

3. The herein described method of preparing photographic plates of the character specified, which method consists in applying to a support a layer of ray absorbing emulsion in a colloidal state, and superimposing on said layer a second layer comprising an emulsion containing light sensitive substance and ray absorbing substance.

4. A photographic plate for the purpose specified, comprising a support having thereon a light sensitive substance and a ray absorbing substance in a colloidal state.

5. A photographic plate for the purpose specified, comprising a support, a layer of ray absorbing substance in a colloidal state on said support, and a second layer of light sensitive substance superimposed on said first layer.

6. A photographic plate for the purpose specified, comprising a support, a layer of ray absorbing substance in a colloidal state on said support, and a second layer comprising a light sensitive substance and a ray absorbing substance superimposed on said first layer.

In testimony whereof we affix our signatures in presence of two witnesses.

Dr. HANS ARNOLD.
Prof. Dr. MAX LEVY-DORN.

Witnesses:
Woldemar Haupt,
Henry Hasper.